US006939229B2

(12) United States Patent
McClintic

(10) Patent No.: US 6,939,229 B2
(45) Date of Patent: Sep. 6, 2005

(54) GAMING METHOD, DEVICE, AND SYSTEM INCLUDING ADVENTURE BONUS GAME

(75) Inventor: Monica A. McClintic, Boulder City, NV (US)

(73) Assignee: IGT, Reno, NV (US)

( * ) Notice: Subject to any disclaimer, the term of this patent is extended or adjusted under 35 U.S.C. 154(b) by 282 days.

(21) Appl. No.: 10/029,384

(22) Filed: Dec. 19, 2001

(65) Prior Publication Data

US 2003/0114220 A1 Jun. 19, 2003

(51) Int. Cl.[7] .......... A63F 13/00
(52) U.S. Cl. .......... 463/25; 273/138.1
(58) Field of Search .......... 463/10–13, 16–22, 463/25, 26, 27, 30, 40, 42; 273/138.1, 139, 143 R

(56) References Cited

U.S. PATENT DOCUMENTS 5,411,271 A 5/1995 Mirando
5,431,408 A 7/1995 Adams
5,664,998 A 9/1997 Seelig et al.
5,803,451 A 9/1998 Kelly et al.
5,823,874 A 10/1998 Adams
5,848,932 A 12/1998 Adams
5,882,261 A 3/1999 Adams
5,980,384 A 11/1999 Barrie
6,015,346 A 1/2000 Bennett
6,050,895 A 4/2000 Luciano, Jr. et al.
6,089,976 A 7/2000 Schneider et al.
6,089,978 A 7/2000 Adams
6,120,031 A 9/2000 Adams
6,149,156 A 11/2000 Feola
6,173,955 B1 1/2001 Perrie et al.
6,174,235 B1 1/2001 Walker et al.
6,179,711 B1 1/2001 Yoseloff
6,190,255 B1 2/2001 Thomas et al.
6,203,429 B1 3/2001 Demar et al.
6,210,275 B1 4/2001 Olsen
6,227,969 B1 5/2001 Yoseloff
6,261,177 B1 7/2001 Bennett
6,287,197 B1 9/2001 Dickinson et al.
6,315,664 B1 11/2001 Baerlocher et al.
6,346,043 B1 2/2002 Colin et al.
6,514,144 B2 2/2003 Riendeau et al.
6,572,471 B1 6/2003 Bennett
6,582,303 B1 * 6/2003 Weiss .......... 463/16
6,605,001 B1 8/2003 Tarantino
6,612,575 B1 * 9/2003 Cole et al. .......... 273/138.1

(Continued)

FOREIGN PATENT DOCUMENTS

EP 1 008 968 6/2000
GB 2 262 642 A 6/1993
WO WO 01/19476 3/2001

OTHER PUBLICATIONS

"Who Wants to be a Millionaire?" (RTM) Quiz machine. As featured at URL: http://www.blazej.demon.co.uk/tplc/yourown.html. (Pleases see printout.).

*Primary Examiner*—Kim Nguyen
(74) *Attorney, Agent, or Firm*—Marshall, Gerstein & Borun LLP

(57) ABSTRACT

A game including at least one level in which a player wagers a resource item to progress to a next-higher level or to receive an award. When the wagered resource item matches a resource item that has been randomly selected from a predetermined group of resource items, such progress or award is granted to the player. The game may comprise a bonus event to a base game of the gaming apparatus, in which the player may have an opportunity to play for one or more resource items. The game may include one or more levels. Awards may be available at each level or upon successfully completing all of the levels of the game. The game may be effected by a stand alone gaming apparatus or by a networked gaming apparatus, in which case the game may be played against others.

9 Claims, 8 Drawing Sheets

U.S. PATENT DOCUMENTS

| | | | | |
|---|---|---|---|---|
| 6,620,045 | B2 | 9/2003 | Berman et al. | |
| 6,669,559 | B1 | 12/2003 | Baerlocher et al. | |
| 6,746,328 | B2 | 6/2004 | Cannon et al. | |
| 2003/0022711 | A1 | 1/2003 | Locke et al. | |
| 2003/0036418 | A1 * | 2/2003 | Seelig et al. | 463/16 |
| 2003/0071417 | A1 | 4/2003 | Webb | |
| 2003/0119580 | A1 | 6/2003 | McClintic et al. | |

* cited by examiner

GAMING METHOD, DEVICE, AND SYSTEM INCLUDING ADVENTURE BONUS GAME

BACKGROUND OF THE INVENTION

1. Field of the Invention

The present invention relates generally to methods, apparatus, and systems for gaming and, more specifically, to methods, apparatus, and systems for effecting an adventure game in which an award is granted for obtaining certain goals.

2. State of the Art

Gaming machines, such as so-called "slot" machines, have long been a significant facet of the gaming industry. The most basic implementation of a slot machine is a mechanical device with multiple vertical spinning reels. The reels are invoked to spin as a player pulls a lever of such a slot machine. When the reels stop at random positions, a symbol or combination of symbols appears along at least one "payline" to indicate winning of credits, money, or another award. The probabilities and predetermined payout for all winning possibilities are controlled to provide a desired or legal "house percentage" of the total monies played.

Video versions of gaming machines have become increasingly popular in recent years, and include fully computerized machines and hybrid machines that include both mechanical and electronic components and which may be referred to as "electromechanical" machines. Continuing with the slot machine example, many video slot machines include a computer-generated depiction of multiple reels, which simulate the mechanical reels of conventional, mechanical slot machines. Play of electronic gaming machines, such as video slot machines, video blackjack machines, video poker machines, and the like, is typically effected by way of one or more processors of such machines under control of software programs which include random number generators (RNGs), which assure a truly random result. Thus, a game may have a statistically sound basis for achieving desired verifiable payout levels for both experienced and inexperienced players.

A current, widespread enhancement to conventional single game gaming machines is the addition of a "bonus" or secondary game or event, which typically occurs if a player achieves at least one selected outcome during play of the underlying base or primary game. Many bonus events are retrofitted as so-called "top boxes" to conventional, single game gaming machines, in which the preexisting game comprises the base game, thus enhancing player appeal with respect to play of the games of gaming machines that are already in service.

In many cases, the bonus game is a singular event, in that play on the gaming machine switches from the base game to the bonus game when a certain base game outcome is achieved, the bonus game then being played to completion. Examples of this type of bonus game, wherein the bonus games are variously configured, are described in U.S. Pat. Nos. 5,823,874, 5,848,932, 5,882,261, and 6,089,978, all of which have been assigned to Anchor Gaming, assignee of the present invention. Progressive games, wherein a portion of wagers is allocated to fund a jackpot, have also been embodied as bonus games. A notably successful example of a so-called "linked progressive", wherein a plurality of gaming machines are linked for purposes of contributing to the award from a bonus event won at one of the linked gaming machines, is the WHEEL OF FORTUNE® bonus game, which is based upon the aforementioned '874 and '932 patents.

In the WHEEL OF FORTUNE® game, players are notified of the various events in the game through visual indicators such as flashing lights, computer generated text images in the display, and audible indicators such as theme music playing. Specifically, a player is notified that he or she has won chance at the bonus event by seeing the symbol appear in the display screen, flashing of a "Spin the Wheel" button on the gaming machine housing and playing of the WHEEL OF FORTUNE® game theme. When the player pushes a button labeled "Spin the Wheel", the bonus wheel spins and sounds of the wheel spinning a generated. When the wheel stops and indicates an award, the sound of audience applause is generated. All of the foregoing elements are intended to enhance the player's gaming experience and to attract other players to the game.

In U.S. Pat. Nos. 5,431,408 and 6,120,031, both of Adams, a gaming machine is disclosed as using a conventional card game, e.g. poker, but operating with the proviso that wild cards dealt in one game, or "hand", may be reserved for use in future games. Thus, a player having a "hand" which is little helped by a wild card may save the card for a future hand, where a wild card may enhance the winnings.

For many players, it would be beneficial to prolong and enhance interaction between the primary or base game and any bonus games, thus maintaining a high level of entertainment value and personalizing the bonus gaming experience. Providing a gaming device with elements of chance as well as skill at a plurality of interacting levels is attractive for many players, whether or not experienced.

BRIEF SUMMARY OF THE INVENTION

The present invention includes computer gaming methods that have discrete levels of play, as well as apparatus and systems configured to effect such computer gaming methods. The game may be designed in its basic configuration to be a "standalone" game, i.e., not connected to a network of other gaming devices for cooperative play, competitive play, or linked progressive play. Alternatively, the game may comprise a game that is played with or against multiple individuals.

In a base or primary level of play in this game, resources are awarded; such resources may include credits or specific resources that may be used in an attempt to enter bonus event play or for use in the bonus event. The specific resources may comprise indicia, representative of corresponding resource items, such as tools, of various types associated with a theme of the bonus event. Wager of a winning type of indicia by a player results in the player being granted entry into a next level of a plurality of sequential bonus levels of the bonus event. A player may collect a library of indicia, such as tools, as well as credits, during play of the base game and/or during play of the bonus event. These indicia may be saved for use in later levels of play. The specific indicia that are required to advance to any of the bonus levels may be randomly determined at the time of play of the base game for entry into the bonus event, or during the bonus event for entry into higher levels thereof. Upon meeting the objective of the bonus event in the final level thereof, the bonus event is over.

The base game may comprise indicia of a standard slot machine, or may be a playing card game (e.g., poker or blackjack) or any other game that may be played on a gaming machine.

In an exemplary embodiment of the game, a player may choose to enter bonus event play at any time. Alternatively, the game may be configured to award entry into the bonus event when specific winning indicia appear, or based on other factors, such as the occurrence of one or more pre-specified events during play of the base game. For example, entry into the bonus event may be based on the player amassing a prespecified amount of winnings in the base game, obtaining a certain qualifying combination of indicia during play of the base game, the passage of a prespecified period of time of play of the base game, or the like. As another example, the player may be required to obtain or that the player be awarded one or more indicia (e.g., tools) during play of the base game before entry into the bonus event will be awarded. In such a case, one or more appropriate indicia that have been obtained by a player during play of the base game may be subsequently used by the player in one or more levels of the bonus event.

Depending upon the desired configuration of the bonus event, each resource item collected by a player may be used once or multiple times.

The bonus event may include features based on metal skill or choice, as well as features that are based on chance. The bonus event may include an adventuresome theme in which a player attempts to achieve a prespecified goal by making certain choices or using (e.g., wagering) certain resource items at specific "locations" during play of the bonus event. The bonus event may include a plurality of levels. Each level may conclude once a player achieves a sub-goal or wins a passage event, such as wagering the appropriate, randomly identified resource item. Upon conclusion of a level of the bonus event, the player may proceed to the next level. Conclusion of the bonus event occurs once the primary goal of the bonus event is achieved, which, in multi-level versions of the bonus event, may happen at the final level thereof.

An exemplary embodiment of the bonus event comprises an adventure video game referred to herein as Tut's Treasure. Each player of the bonus event represents a treasure seeker who is challenged to gain access into Tut's Tomb, and then by sequentially breaking through walls or sealed doors in tomb passages, enter a secret crypt holding Tut's treasure. During play of the base game, tools may be collected by the player and subsequently used in the bonus event to break down walls and/or doors in the tomb. A player may also receive an award (e.g., game credits, money, other awards) upon receiving certain tools. Additional tools may be purchased with credits. A player uses strategy to determine the optimum set of tools to collect and use.

Upon the occurrence of a predetermined event during play of a base game, the player may proceed to the bonus event or, optionally, opt to delay entry into the bonus event until more tools have been acquired during play of the base game.

Once play of the bonus event is initiated, a series of sequential bonus events may be presented, which may be at least partially based on action of a random number generator (RNG), in which a player is offered an option to attempt to break through a chamber wall or sealed door by using a selected tool, the necessary tool, which is unknown to the player, having been determined by the RNG. If the player lacks the necessary tool or tools to proceed in the bonus event, the player may purchase additional tools or return to play of the bonus game, in which additional tools may be won. The player may progress through the bonus event by using the tool or tools that are required for "breaking through" a particular series of chamber walls or sealed doors. Successful access through the tomb levels leads to the desired treasure-containing crypt.

The player's progress in the bonus event may be portable. In order to provide such portability, the game may be adapted for use with a player tracking card, or so-called "smart card", which records the player's progress through the bonus event, tools collected, and credits. Thus, a player may exit the bonus event and re-enter it later on the same or a different game machine, starting at the same progress level at which the game was earlier exited. The player may, therefore, avoid forfeiting or leaving an advanced play level, tools, or accumulated credits to another player.

In addition, differing game formats may be devised using the same architecture. Thus, for example, a player may exit a Tut's Treasure video game with the progress level, collected tools and credits stored on a player tracking card (e.g., "smart card"). The player may then play another game of differing "story and visual" content but with the same architecture, and begin at an advanced level and with the equivalent final "tools" and credits of the prior game.

The gaming machine may include a single processor or group of processors that effect play of the base game and the bonus game, or as a hybrid unit including an existing gaming machine on which the base game may be played and an ancillary "top box" installed on the gaming machine to add the possibility for play of the bonus event to the existing gaming machine.

A gaming machine of the invention may be connected to an accounting and gaming information system operatively coupled to a central server computer. The system may include a player tracking module and a pit, cage and credit system for providing automated casino transactions. It is contemplated that the game of the present invention may be implemented with a bank of networked gaming machines and further contemplated that the game may be implemented as a linked progressive game among a plurality of networked gaming machines at a single or plurality of different sites.

Many versions of the gaming device and play methods are possible by changing the game "rules", and the gaming device may be configured to permit a player to choose a particular version to play.

BRIEF DESCRIPTION OF THE SEVERAL VIEWS OF THE DRAWINGS

The nature of the present invention as well as other embodiments thereof may be more clearly understood by reference to the following detailed description of the invention, to the appended claims, and to the several drawings herein, wherein:

DETAILED DESCRIPTION OF THE INVENTION

Figure 1:
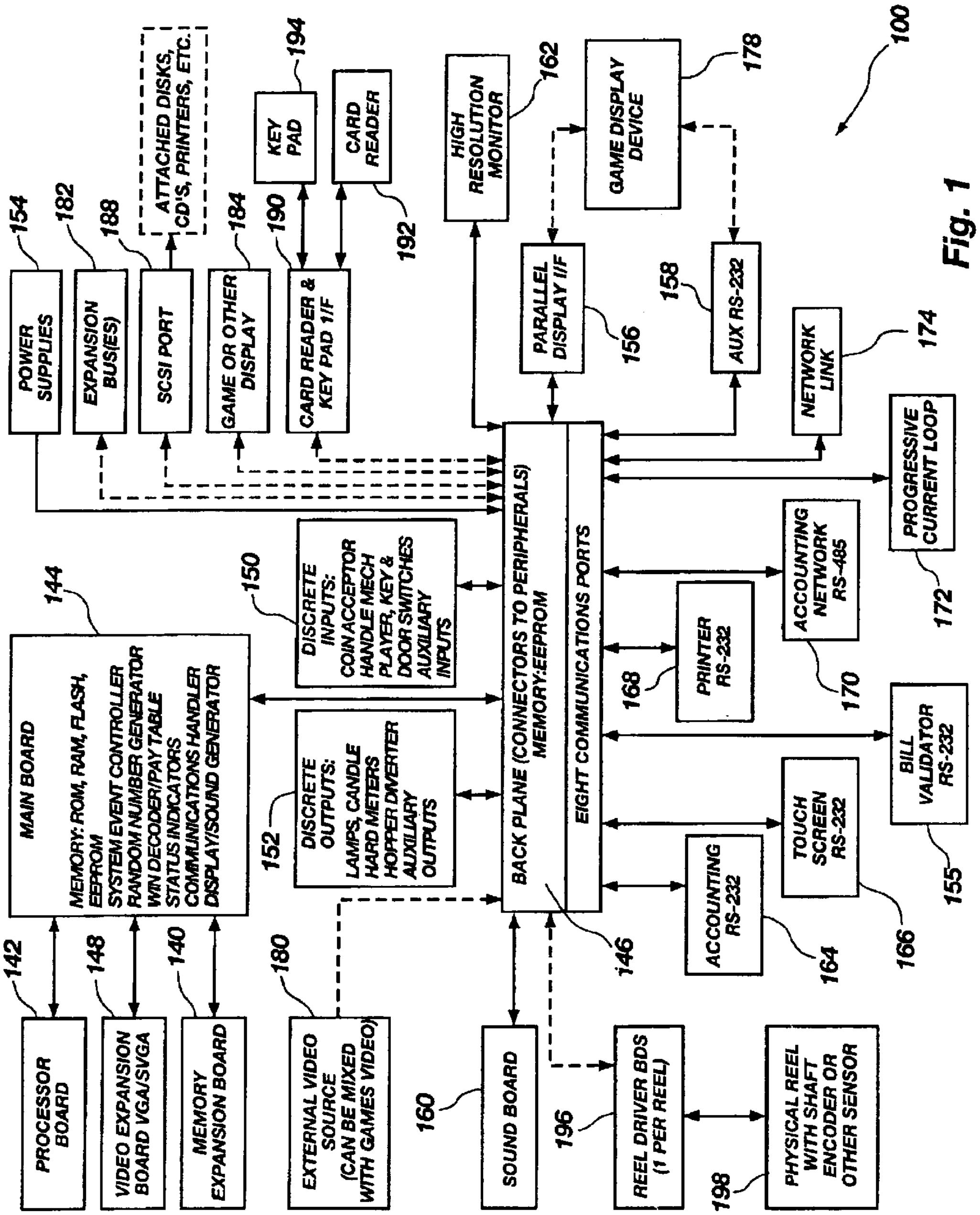
FIG. 1 is a schematic block diagram of an exemplary gaming machine architecture suitable for use in implementing the present invention.

In use and operation, and referring to FIG. 1, gaming machine or device 100 includes a memory board 140, a processor board 142, a main board 144 and a back plane 146 integrally or separately formed. Memory expansion board 140 as well as processor board 142 including a graphics system processor and video expansion board VGA/SVGA 148, are operably coupled to the main board 144. The main board 144 preferably includes memory in the form of ROM, RAM, flash memory and EEPROM (electrically erasable programmable read only memory). In addition, the main board 144 includes a system event controller, a random number generator 200, a win decoder/pay table, status indicators, a communications handler and a display/sound generator.

The main board 144 is operably coupled to the back plane 146, which may include additional memory, such as in the form of an EEPROM, and connectors to connect to peripherals. Furthermore, the back plane 146 provides a plurality of communication ports for communicating with external peripherals. The back plane 146 provides the coupling between discrete inputs 150 and the processor board 142 and main board 144. Typical examples of elements that provide discrete inputs are coin acceptors, game buttons, mechanical hand levers, key and door switches and other auxiliary inputs. Furthermore, the back plane 146 provides the coupling between discrete outputs 152 and the processor and main board 144. Typically and by way of example only, elements that provide discrete outputs 152 are in the form of lamps, hard meters, hoppers, diverters and other auxiliary outputs.

The back plane 146 also provides connectors for at least one power supply 154 for supplying power for the processor and a parallel display interface (PDI) 156 and a serial interface 158 for game display device 178. In addition, the back plane 146 also provides connectors for a soundboard 160 and a high-resolution monitor 162. Furthermore, the back plane 146 includes communication ports for operably coupling and communicating with an accounting network 164, a touch screen 166 (which may also serve as a game display device), a bill validator 155 incorporated in a currency (bill) acceptor, a printer 168, an accounting network 170, a progressive current loop 172 and a network link 174.

The back plane 146 optionally includes connectors for external video sources 180, expansion buses 182, game or other displays 184, an SCSI port 188 and an interface 190 for at least one card reader 192 (debit/credit, player card, etc.) and key pad 194. The back plane 146 may also include means for coupling a plurality of reel driver boards 196 (one per reel) which drive physical game reels 198 with a shaft encoder or other sensor means to the processor board 142 and main board 144 if a gaming device 100 is configured for play of a reel-type game. Of course, the reels may be similarly implemented electronically by display as video images, technology for such an approach being well known and widely employed in the art. In such an instance reel driver boards 196 and physical game reels 198 with associated hardware are eliminated and the game outcome generated by the random number generator on (RNG) 200 on main board 144 is directly displayed on a video game display 184 and, optionally, on a separate game display device 178, as known in the art. Other gaming machine configurations for play of different wagering games such as video poker games, video blackjack games, video Keno, video bingo or any other suitable primary games are equally well known in the art. It will also be understood and appreciated by those of ordinary skill in the art that selected components of gaming device 100 may be duplicated for play of a bonus game or event in accordance with the present invention, in that at least a separate board with a second random number generator may be employed, with associated peripherals and links thereto, for play of the bonus game. In the conventional situation wherein the bonus game of the present invention may be operably coupled as a "top box" or otherwise associated with a conventional, existing gaming machine configured for play of a base game, many of the components illustrated in FIG. 1 and described with respect thereto will be duplicated, including separate software and associated memory for conducting play of the bonus game with associated pay tables for the bonus awards.

It will also be understood and appreciated by those of ordinary skill in the art that selected components of gaming device 100 may be duplicated for play of a bonus game or event in accordance with the present invention, in that at least a separate board with a second random number generator may be employed, with associated peripherals and links thereto, for play of bonus games.

In implementation of a standalone version of the present invention, orchestrated audio and visual effects that are both attractive and dynamic in nature, are provided by software in the main board 144 and appropriate hardware. The atmosphere that is created by full-motion video animation with sound provides for exciting and enjoyable play, and attracts the attention of others, particularly during play events. During idle periods, such effects may be continued, and include the audio-visual effects of reel spins, winning sequences, and the like.

Figure 2:
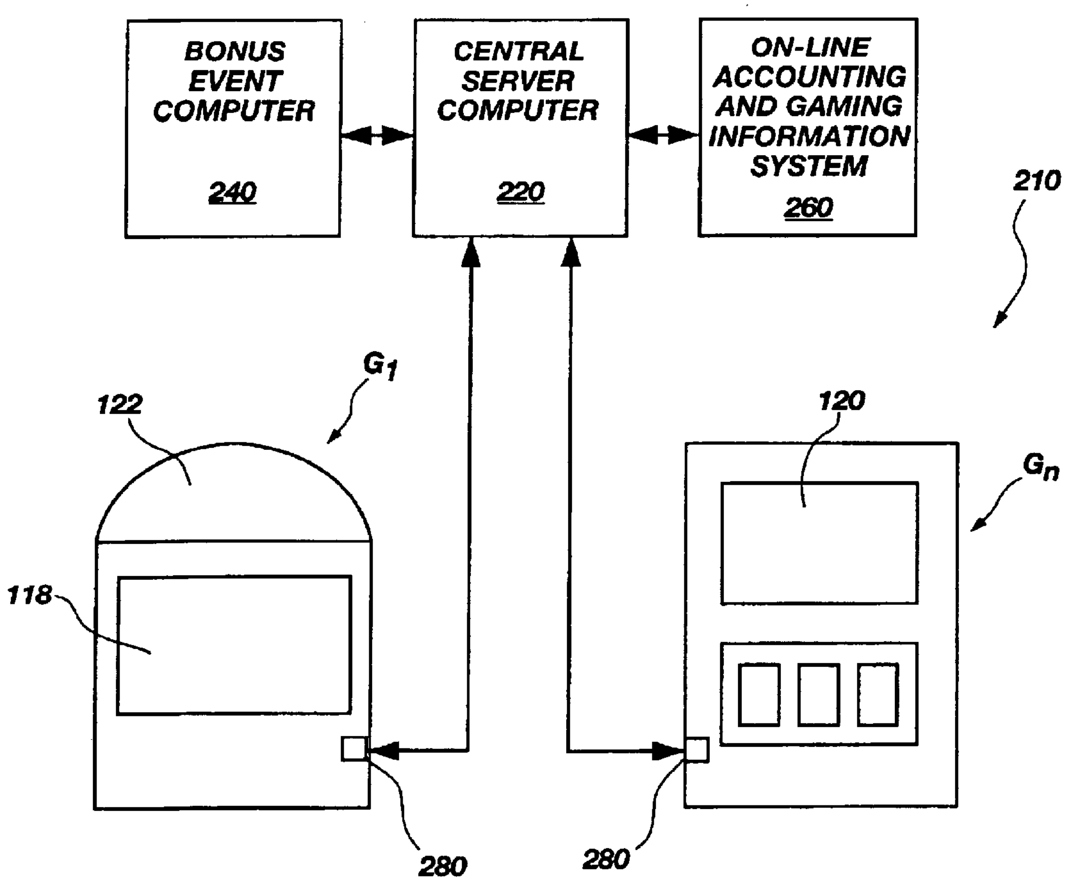
FIG. 2 is a diagrammatic representation of a competitive bonus gaming network according to the present invention.

In implementation of the present invention, the gaming machines offering play of the bonus event of the present invention may be deployed, as schematically depicted in FIG. 2, in a gaming network 210 that includes a central server computer 220 operably coupled to a plurality of gaming machine $G_1$, $G_2$ . . . $G_n$ which may include both electronic and reel type game machines. It is notable that, unless the gaming network 210 is configured for progressive play, a variety of different makes of gaming machines $G_1$, $G_2$ . . . $G_n$ offering widely different games may incorporated in gaming network 210, since the bonus event operates independently of the primary game on each gaming. The central server computer 220 automatically interacts with a plurality of gaming machines $G_1$, $G_2$ . . . $G_n$ to activate a bonus event.

More specifically, and again referring to FIGS. 1 and 2, the gaming network 210 includes a central server computer 220, a bonus event computer 240 and a plurality of gaming machines $G_1$, $G_2$. . . $G_n$. Each gaming machine $G_1$, $G_2$ . . . $G_n$ includes a controller assembly 280 operably coupled to the central server computer 220 and is comprised of a controller unit designed to facilitate transmission of signals from each individual gaming machine $G_1$, $G_2$ . . . $G_n$ to central server computer 220 for monitoring purposes. In addition, the controller assembly 280 includes a network interface board fitted with appropriate electronics for each specific make and model of each individual gaming machine $G_1$, $G_2$ . . . $G_n$.

Referring to FIG. 2, in electronic video games, the central server computer 220 is operably coupled to at least one video game display element 118 as shown at the left hand side of FIG. 2 and sequesters a portion of the video game display element 118 for displaying video attract sequences to attract potential players. Video game display element 118 may be used for display of both the primary and bonus games. Where the gaming network 210 includes reel type game machines $G_1$, $G_2$ . . . $G_n$, as shown at the right hand side of FIG. 2, the central server computer 220 may be operably coupled to at least one active display element 120 so that potential players receive a clear indication of attract sequences and the active display element 120 may be used as a video display for the bonus game. As shown at the left hand side of FIG. 2, the gaming machines $G_1$, $G_2$ . . . $G_n$ may also be provided with a second video display element 122 as an alternative to sequestering a portion of the video game display element 118 for displaying video attract sequences and the bonus game. In addition, the central server computer 220 may include sound generating hardware and software for producing attractive sounds orchestrated with the video attract sequences at each of gaming machines $G_1$, $G_2$ . . . $G_n$ if such is not already incorporated therein. The games support input and output between the player and the game for such devices as heads up display, joystick, keyboard, mouse and data glove via interface modules connected through the expansion bus or buses 182 and SCSI port 188.

The attractive multimedia video displays and dynamic sounds may be provided by the central server computer 220 by using multimedia extensions to allow gaming machines $G_1$, $G_2$ . . . $G_n$ to display full-motion video animation with sound to attract players to the machines. During idle periods, the gaming machines $G_1$, $G_2$ . . . $G_n$ preferably display a sequence of attraction messages in sight and sound. The videos may also be used to market specific areas of the casino and may be customized to any informational needs.

Furthermore, the gaming network 210 includes bonus event computer 240 operably coupled to the central server computer 220 for scheduling bonus parameters such as the type of bonus game, pay tables and players. The functions of central server computer 220 and bonus event computer 240 may, of course, be combined in a single computer. Preferably, the gaming network 210 further includes a real-time or on-line accounting and gaming information system 260 operably coupled to the central server computer 220. The accounting and gaming information system 260 includes a player database for storing player profiles, a player tracking module for tracking players and a pit, cage and credit system for providing automated casino transactions.

Figure 3:
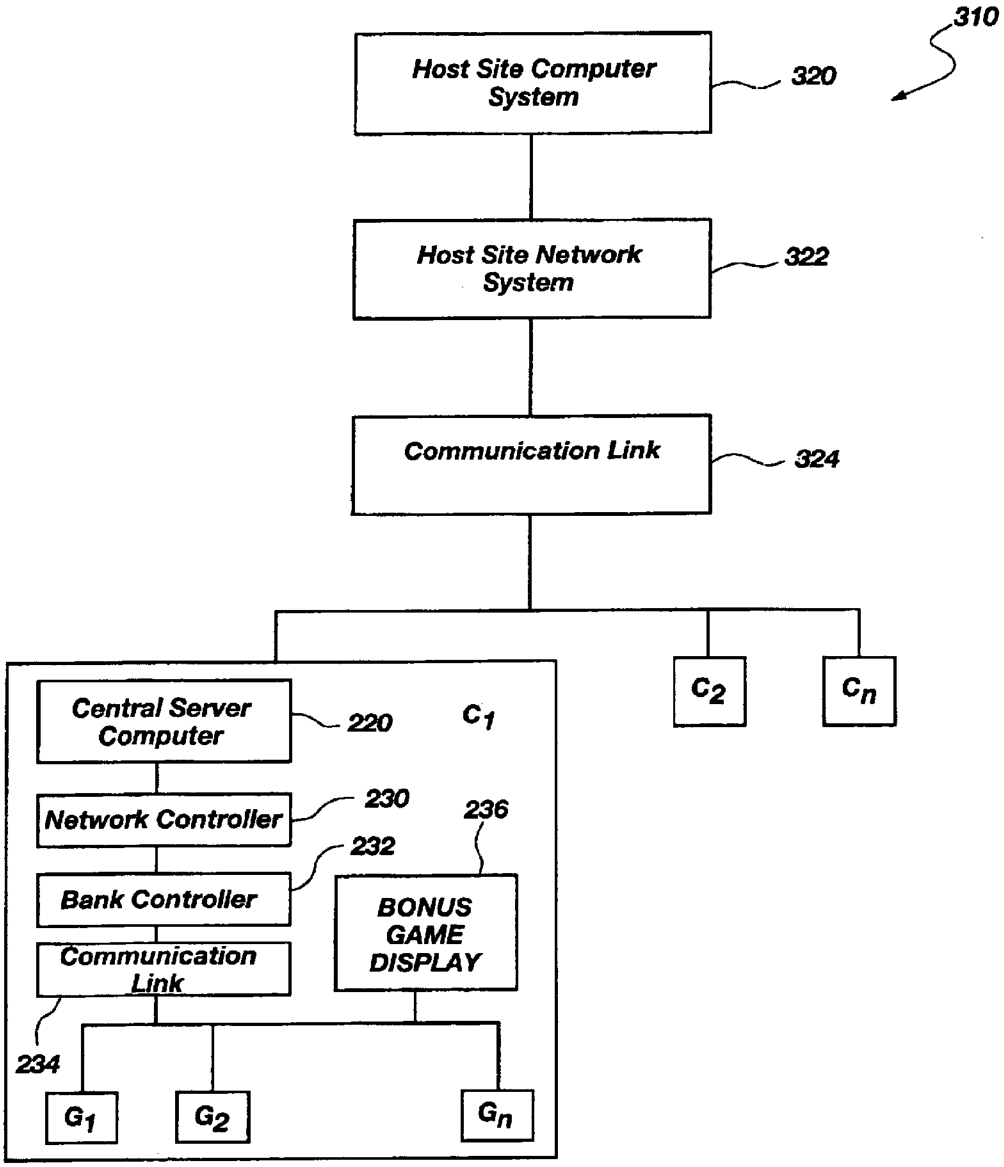
FIG. 3 illustrates an exemplary competitive bonus game system according to the present invention.

As previously implied, a bank of gaming machines $G_1$, $G_2$ . . . $G_n$ may be networked together in a progressive configuration, as known in the art, wherein a portion of each wager to initiate a primary game may be allocated to bonus event wards. In addition, and referring to FIG. 3, a host site computer 320 is coupled to a plurality of the central servers computers 220 at a variety of mutually remote casinos or other gaming sites $C_1$, $C_2$ . . . $C_n$ for providing a multi-site linked progressive automated bonus gaming system 310.

Preferably, the host site computer 320 will be maintained for the overall operation and control of the system 310. The host site computer 320 includes a computer network 322 and a communication link 324 provided with a high-speed, secure modem link for each individual casino site $C_1$, $C_2$ . . . $C_n$.

Each casino or other gaming site $C_1$, $C_2$ . . . $C_n$ includes the central server computer 220 provided with a network controller 230 which includes a high-speed modem operably coupled thereto. Bidirectional communication between the host site computer 320 and each casino site central server 220 is accomplished by the set of modems transferring data over communication link 324.

A network controller 230, a bank controller 232 and a communication link 234 are interposed between each central server 220 and the plurality of networked gaming machines at each casino site $C_1$, $C_2$ . . . $C_n$. In addition, the network controller 230, the bank controller 232 and the communication link 234 may optionally be interposed between each central server 220 and at least one separate display 236 at each casino site $C_1$, $C_2$ . . . $C_n$. However, the system 310 may include hardware and software to loop back data for in-machine meter displays to communicate with bonus event award insert areas on gaming machines $G_1$, $G_2$ . . . $G_n$.

Figure 1A:
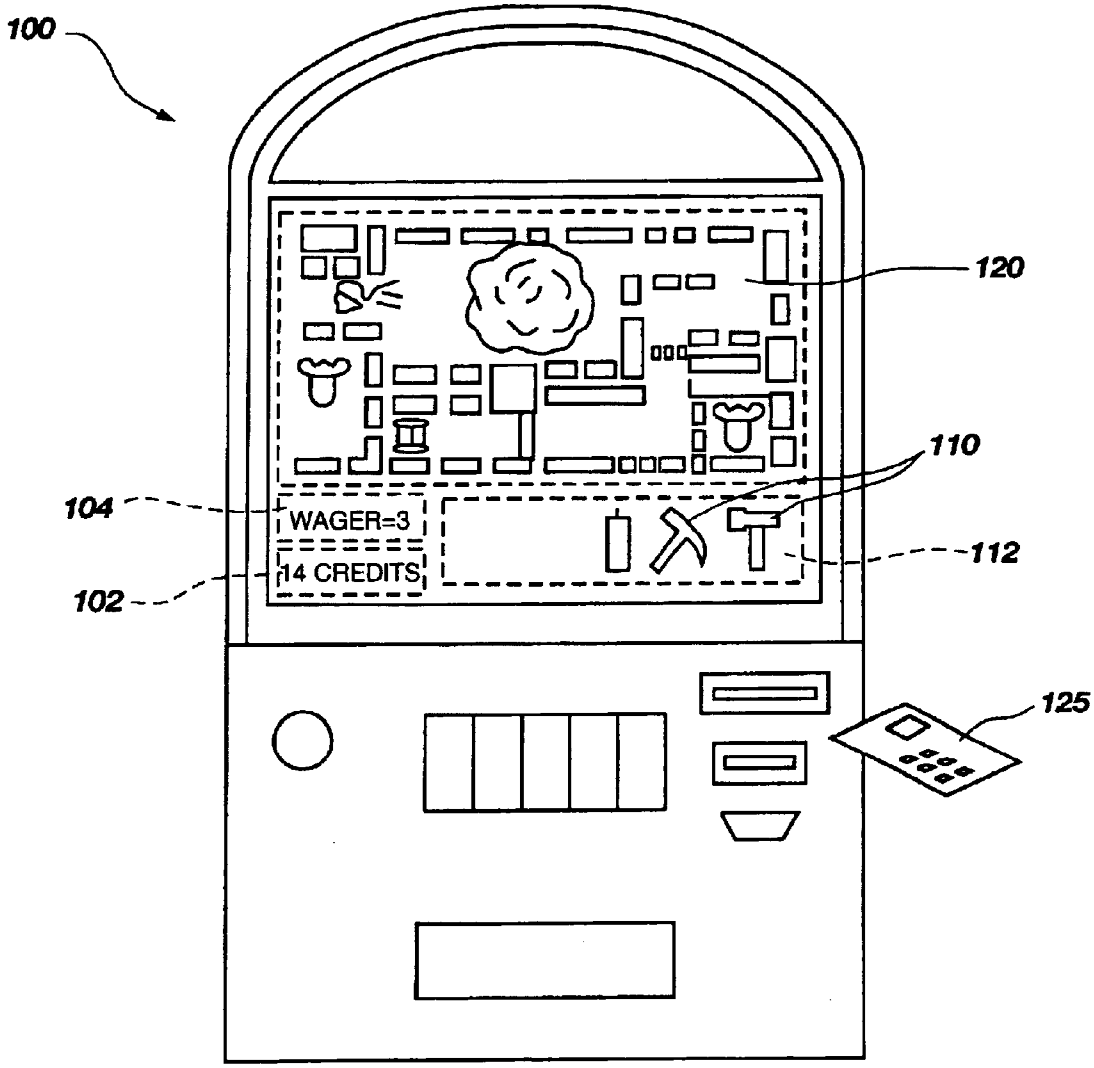
Figure 4:
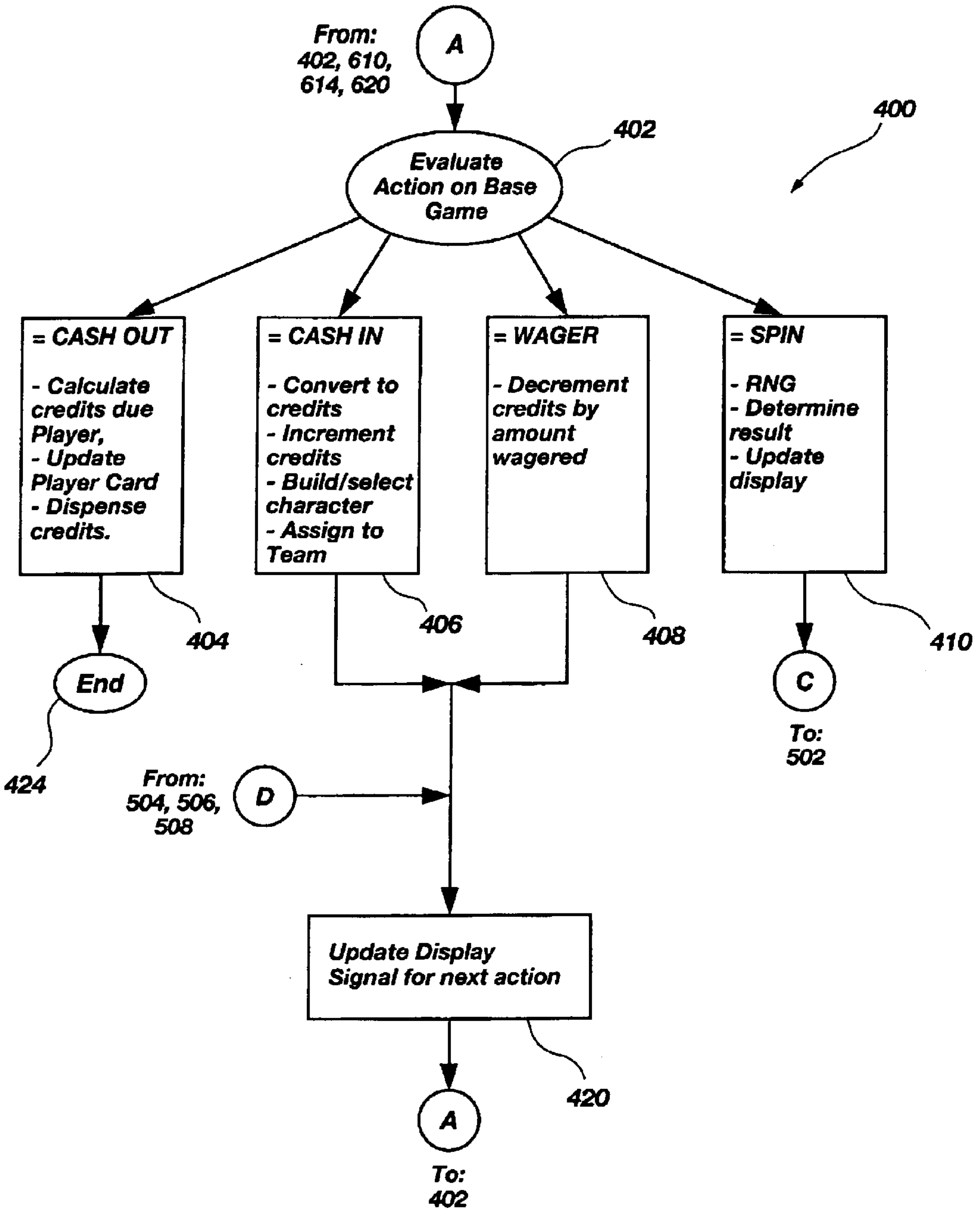
FIGS. 4 and 5 together are a flow chart of an exemplary base level implementation of an embodiment of the game of the present invention.
Figure 5:
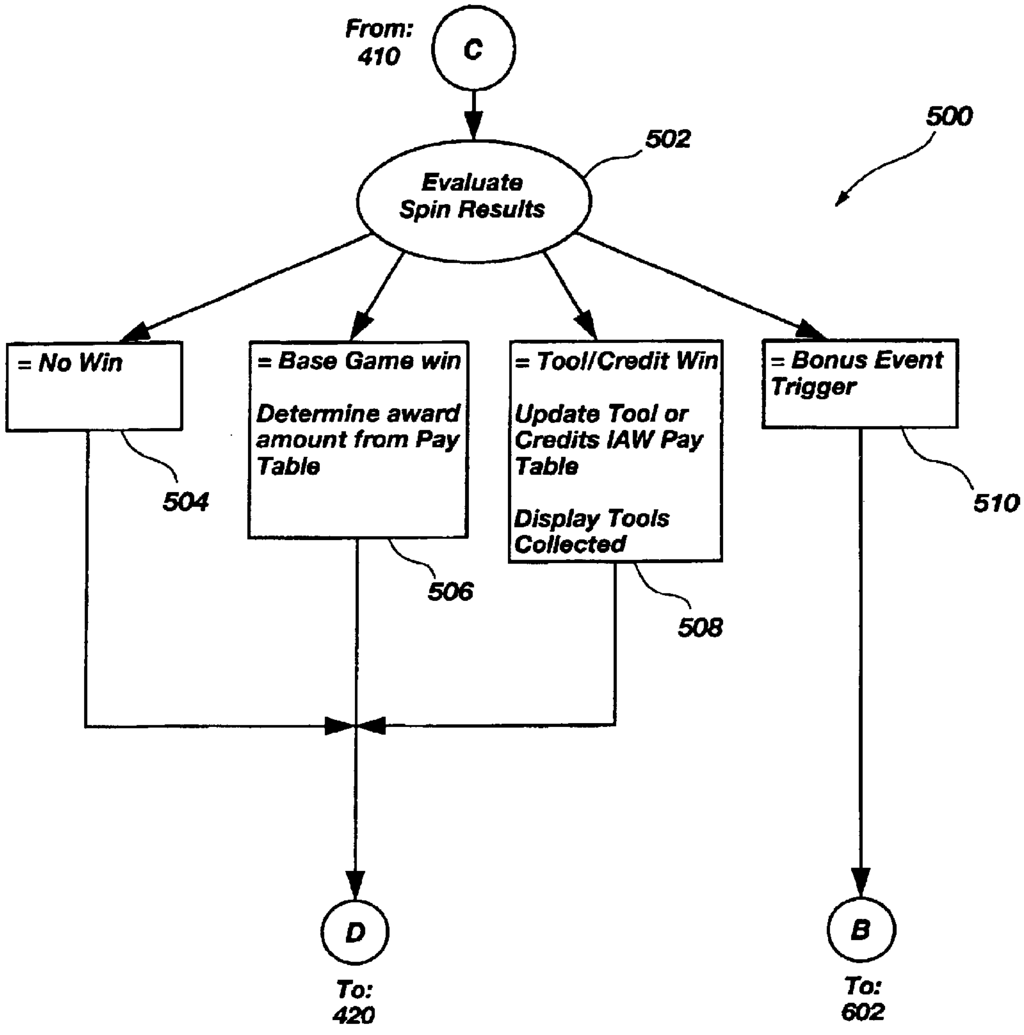
Figure 6:
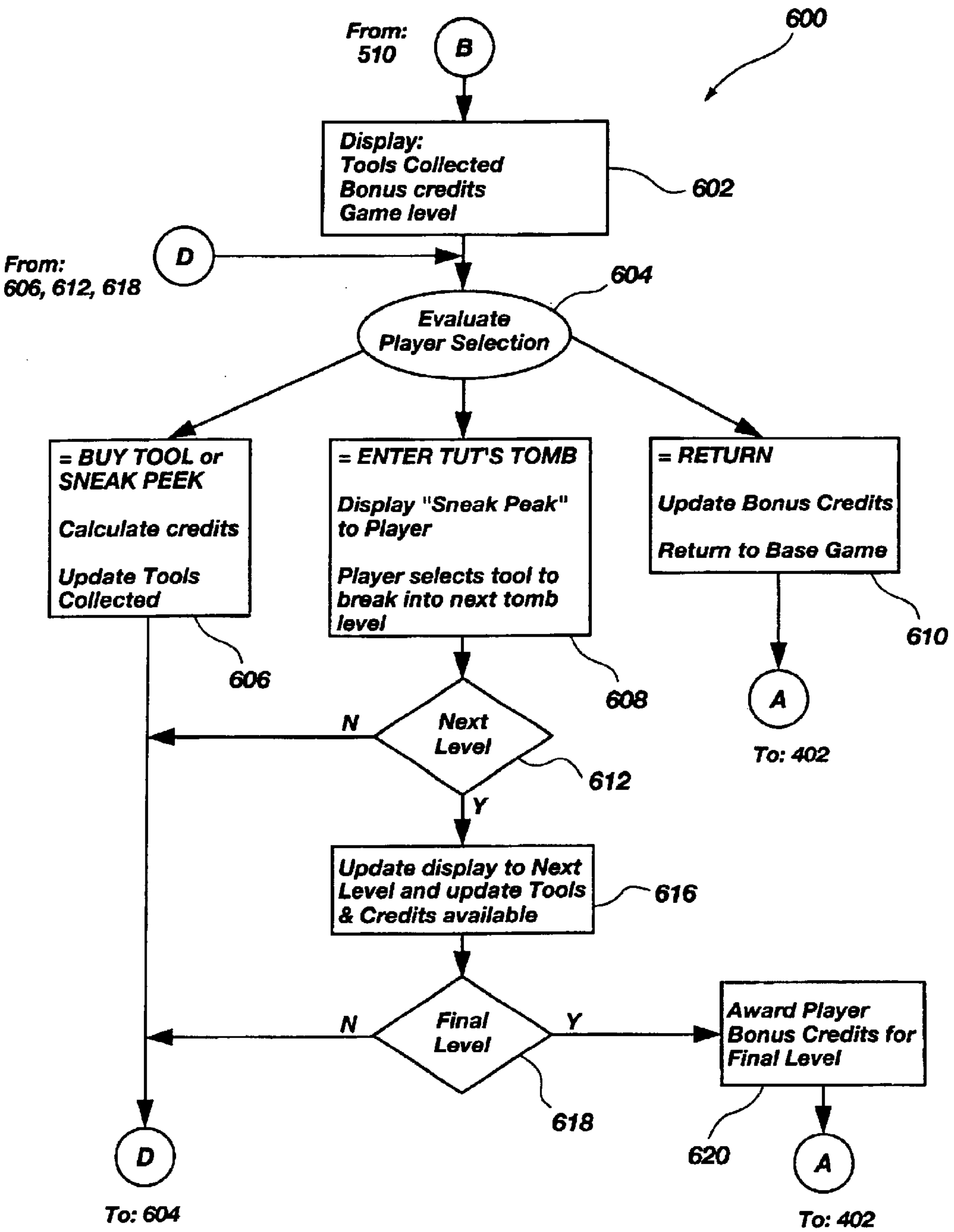
FIG. 6 is a flow chart of an exemplary bonus level implementation of an embodiment of the game of the invention, and is connectable to FIGS. 4 and 5.

With reference again to FIG. 1, as well as to FIG. 1A and the flow chart of FIGS. 4–6, exemplary sequence of events for play of the gaming machine 100 is shown. A player begins play on gaming machine 100 by first placing cash, at reference character 406 of FIG. 4, into the machine via a coin acceptor 152, a dollar bill validator 155 or by credits 102 transferred from a player card 125, which may be a so-called “smart card”. The player then selects an amount of credits 102 to wager, which may be depicted on a display element 120 of a high-resolution monitor 162 of the gaming machine 100 as a wager amount 104, at reference character 408 of FIG. 4, and initiates play. Play of a base game of gaming machine 100 is initiated at reference character 410 of FIG. 4 by pressing a “play” or “deal” button, pulling a handle, touching an icon on a video touch screen 166 or by other means as available on the machine 100. The number of credits 102 which may be wagered is generally limited by minimum and maximum values, such as, for example, one to four credits 102. Payouts of any credit winnings, in an amount determined from a pay table at reference character 506 of FIG. 5, may be roughly proportional to the wagered credits 104 and are incremented to the player’s net credits 102. The base game play and at 424. Credits 102 and tools 110 are decremented from the player’s tool bar and net credits 110 as they are wagered during play of the base game and bonus event. The display is updated at 420.

In a gaming machine 100 having a plurality of mechanical reels 198, the wager and play initiation results in spinning of the reels, the stopping places of which determine an outcome which may include winning one or more of credits 102 at 506 in accordance with (IAW) a pay table and/or tools at 508 or result in no win at 504. In an electronic video version of gaming machine 100, random number generator 200 (FIG. 1) determines the outcome relating to credits 102 or tools 110 which are awarded. A predetermined pay table lists the payout for various play results and amount wagered. As an example, where the base game is a video poker game with a minimum wager is 25 credits (e.g., 25 cents), a pay table may be as follows:

| | Payout at wager levels (credits) of: | | | | |
|---|---|---|---|---|---|
| | 25 | 50 | 75 | 100 | 125 |
| Pair of Jacks or better | 25 | 50 | 75 | 100 | 150 |
| Two Pairs | 25 | 50 | 75 | 100 | 150 |
| Three of a Kind | 30 | 60 | 90 | 120 | 175 |
| Flush | 40 | 80 | 120 | 160 | 240 |
| Full House | 50 | 100 | 150 | 200 | 300 |
| Four of a Kind | 75 | 150 | 225 | 300 | 450 |
| Straight Flush | 100 | 200 | 300 | 400 | 560 |
| Royal Flush | 500 | 1000 | 1500 | 2000 | 3000 |

It will be observed that the payout is generally proportional to the amount wagered. In this example, a small bonus payout is also awarded when the maximum permissible number of credits (e.g., 125 credits) is wagered. This bonus is incorporated in the pay table.

One or more tools 110 may also be randomly awarded during play of the base game or, more preferably, during play of any level of the game, including one or more levels 704, 705, 706 (FIG. 7) of the bonus event. In this example, the number of different types of tools 110 is preset at five, shown in FIG. 7 as tools 710, 712, 714, 716, and 718. The game permits a player to collect and save more than one tool 110 of the same type in his or her tool library 112.

If winning combination is not achieved during play of the base game, the display 184 or 178, which provides an indication of the current play level, tools collected and net credits, is updated. The player may then replay the base game or exit from the game (i.e., "cash out"). If desired, the player may purchase one or more tools 110 that may be wagered in play of a subsequent, bonus event level, or in seeking to advance to a first level of the bonus event 600.

If a tool 110 is purchased, the cost is decremented from the player's net credits 102. The game may be set up so that a purchaser cannot specify the type of tool 110 to be purchased. Alternatively, the game configuration may permit a player to select a particular tool 110. It is noted that such variations in the game, as well as other variables indicated herein, are taken into account in setting the probabilities for winning plays, in order to maintain a long-term desired payout and meet government regulations.

The levels of a bonus event that follows the base game require a specific tool or tools 110 which match(es) the winning tool or tools randomly picked by a random number generator 200. The tools 110 collected, bonus credits and game level are displayed at 602. An attempt by a player to advance to the next level is called herein a "progression event" 608. In one embodiment of the game, a progression event 608 (FIG. 6) is presented to a player by a "random event trigger" 510 (FIG. 5), selected by achieving a given wheel spin result, by attaining a preselected number of plays, by the random number generator, or by other methods. When a progression event 608 (FIG. 6) is triggered, a player may opt to: (a) enter the bonus event at 608, wagering a tool 110 in an attempt to advance to the next level; (b) continue to play the base game or at the current bonus level to attempt to obtain more credits 102 or tools 110; (c) purchase one or more additional tools 110 with credits 102; or (d) exit the game, saving the collected tools and credits for future play on a smart card or other memory apparatus that may subsequently accessed and/or used by the player. Each successive bonus event is directed to advancing through a series of bonus levels at 612 to a fixed level at 618, and the player may use intermittent respites at the base game or a lower bonus level to add tools 110 and/or credits 102 to his or her tool library 112. As each other bonus level is reached, the display is updated and tools 110 and credits 102 available made current at 616. When the final level is reached, the players is awarded bonus credits at 620.

In another embodiment of the invention, a player may enter a progression event 608 (FIG. 6) at anytime, provided his or her tool library 112 contains at least one tool 110.

Figure 7:
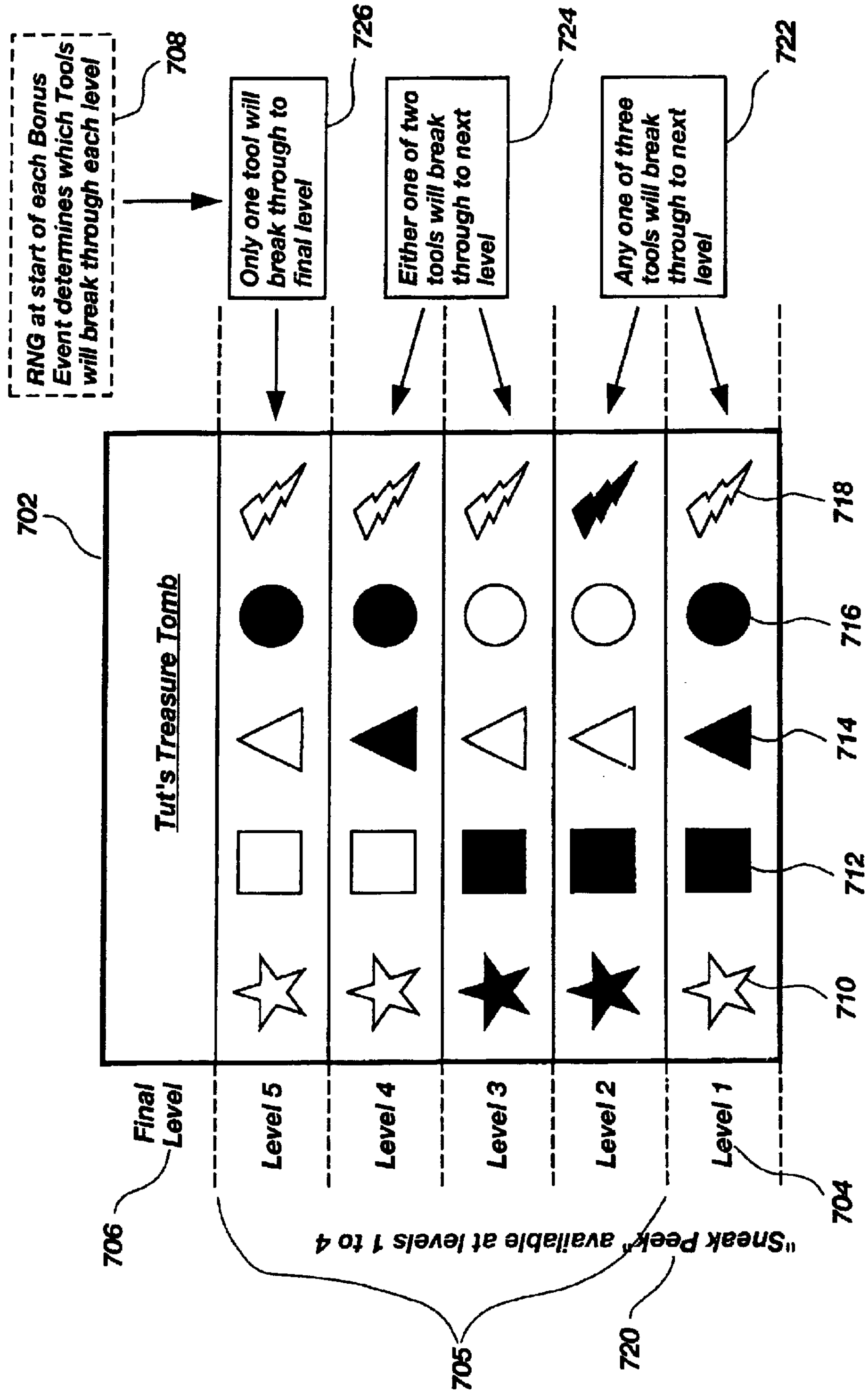
FIG. 7 is a schematic illustration of levels of play and factors related thereto in an exemplary embodiment of a game of the present invention.

With reference to FIG. 7, the hierarchy of a game incorporating teachings of the present invention lends itself to a particular bonus event format, which is referred to herein as "Tut's Treasure". In an example of this game, Tut's Tomb has six bonus levels, including a first bonus level 704, four intermediate bonus levels 705, and a final bonus level 706. In this game, a player's objective is to obtain tools 110 for breaking down walls or sealed doors within Tut's Tomb and advance sequentially, level by level, toward the final bonus level 706, in which a crypt holding Tut's Treasure is located. Entry into the first bonus level 704 and each subsequent bonus level 705, 706 may be conditioned upon wagering one or more of the tools 110 (FIG. 1A) that were obtained during play of the base game or the bonus event. Advancing to the next bonus level may also result in the player being provided with additional credits 102 (FIG. 1A). The player has no idea which tool 110 will be effective for advancing into each bonus level 705, 706. In a preferred embodiment, a random number generator function 708 determines which tool or tools 110 will be effective for advancing the player, at the time of play of the bonus event.

FIG. 7 shows examples of tools 110 (FIG. 1A) that may be randomly selected for entry into each level 704, 705, 706 of the bonus event. Winning tools 110 are selected from a pool of five different tools 110, herein exemplified as TNT 710, SPADE 712, PICK 714, LASER 716 and PHASER 718, shown schematically as simplified shapes. The symbols for these tools 110 are shown on each level for advancing into the next level. As depicted, any three of the five tools 710, 712, 714, 716, 718 may be randomly selected by a random number generator 200 (FIG. 1). One of these three tools is subsequently required for advancement 722 beyond each of the first bonus level 704 and subsequent levels 705 of the bonus event. In FIG. 7, the darkened tools are examples of those that may be randomly selected as providing entry into the next-higher level 705, 706. Thus, a player attempting to advance beyond the first bonus level 704 by wagering any given tool 710, 712, 714, 716, 718 has a probability of success equal to 0.6. The same probability is indicated for advancing beyond the second bonus level 705.

Advancing beyond the third and fourth bonus levels 705 requires that one of two randomly selected tools of the five tools 710, 712, 714, 716, 718 be wagered, examples of which are shown in FIG. 7 as being darkened. The probability of a player achieving advancement in each case is 0.4. Advancing to the final bonus level 706, which contains Tut's Treasure 702, requires the wager of a tool 710, 712, 714, 716, 718 that matches a single tool selected by the random number generator 200 (FIG. 1). Thus, the probability of a player selecting the proper tools is 0.2. A player may continue to wager a tool as long as there is a tool left in the tool library 112. If the player loses all of his tools 110 (FIG. 1A) without successfully progressing to the next bonus level, he or she may return to the base game or continue play at a current bonus level to acquire more tools 110, and then may retry to enter the final bonus level 706.

A player may be required to use or wager the same type of tool 710, 712, 714, 716, 718 to progress beyond more than one of the bonus levels 704, 705 of the bonus event. When a tool 710, 712, 714, 716, 718 is wagered, that tool may be removed from the tool library 112 (FIG. 1A).

Of course, the game may be configured so that play of the bonus event requires wager of credits 102 (FIG. 1A) as well as a tool 110 (FIG. 1A). In addition, the game may be configured so that wagering the maximum number of credits 102 during bonus play may result in the possibility of increased credit winnings, as well as other prizes.

Another feature which may be incorporated into the game is use of a "sneak peek" 720, which may be purchased by a player while playing at a lower level of the bonus event. The sneak peek 720 provides the player with an indication of at least one winning tool 710, 712, 714, 716, 718 for advancing to the next bonus level 705. The random number generator 200 (FIG. 1) may be adjusted to include this particular tool as one of its winning tools. Alternatively, the tool that is displayed by use of the sneak peek 720 feature may be selected from the group of tools that were previously selected by the random number generator 200. The sneak peek 720 feature may not used for assisting the player in advancing to the final bonus level 706.

Once a bonus award is made, it is logged onto a bonus credit meter or a consolidated award credit meter, as known in the art, to either be retrieved by the player or used for further wagers, all as known in the art. If the payout is sufficiently large to require an IRS form W2G, the gaming machine preferably locks up and a signal is sent to central server computer 220 for reconciliation of the award.

The multi-level game as described has many configurations and optional features. It may be formed to incorporate electronic play at all levels, not requiring physical reels. It may be applied in a "top box" form in combination with a conventional base game gaming machine. In such a configuration, it employs a visually perceptible representation, such as a video representation on video display of bonus play and base play results. A keypad, either on the gaming machine housing, such as keypad 194 described in the context of FIG. 1, or a portion of a touch screen on the gaming machine, such as touch screen 166 described in the context of FIG. 1, may be employed to input player decisions relating to bonus events.

While the foregoing describes a game with a plurality of bonus levels, a simple form of the game may include a single base game and a bonus event with a single level of play. Alternatively, the number of bonus levels may be any number.

It will be recognized from the above description that the gaming device and game method of this invention enables strategy to be used by a player in a regulated gaming environment, adding a great deal of interest and excitement to playing the game.

While the present invention has been disclosed herein in terms of certain exemplary embodiments, those of ordinary skill in the art will recognize and appreciate that it is not so limited. Many additions, deletions and modifications to the disclosed embodiments may be effected without departing from the scope of the invention. Moreover, features from one embodiment may be combined with features from other embodiments. The scope of the instant invention is only to be limited by the claims that follow.

What is claimed is:

1. A gaming apparatus comprising:

a value input device;

a display element; and a processor operatively coupled to the value input device, the display element, and a memory, the processor receiving a wager via the value input device from a player;

the processor causing the display element to display an image representative of a base game;

the processor determining if an event has occurred in the base game;

the processor awarding the player at least one resource item to a set of player resource items from a set of possible resource items, the set of possible resource items comprising a plurality of resource items, if the event has occurred;

the processor determining if a bonus event has occurred;

the processor causing the display element to display an image representative of a bonus game if the bonus event has occurred;

the processor selecting at least one resource item from the set of possible resource items if the bonus event has occurred;

the processor receiving a player selection of at least one resource item from the set of player resource items if the bonus event has occurred; and the processor determining if the at least one resource item selected by the processor from the set of possible resource items matches the at least one resource item from the set of player resource items corresponding to the player selection.

2. The gaming apparatus according to claim 1, comprising:

the processor inquiring of the player if the player wishes to play the bonus game if the bonus event has occurred;

the processor receiving a negative from the player in response; and the processor returning to the base game as a result of receiving the negative from the player.

3. The gaming apparatus according to claim 2, comprising, after returning to the base game:

the processor receiving a wager via the value input device from the player;

the processor causing the display element to display an image representative of the base game;

the processor determining if an event has occurred in the base game; and the processor awarding the player at least one additional resource item to a set of player resource items from the set of possible resource items, the set of possible resource items comprising the plurality of resource items, if the event has occurred.

4. The gaming apparatus according to claim 2, comprising, after returning to the base game and until such time as the processor does not receive the negative in response to inquiring of the player if the player wishes to play the bonus game if the bonus event has occurred:

the processor receiving a wager via the value input device from the player;

the processor causing the display element to display an image representative of the base game;

the processor determining if an event has occurred in the base game; and the processor awarding the player at least one additional resource item to a set of player resource items from the set of possible resource items, the set of possible resource items comprising the plurality of resource items, if the event has occurred.

5. The gaming apparatus according to claim 1, comprising, prior to receiving the player selection of at least one resource item, the processor disclosing to the player the at least one resource item selected by the processor from the set of possible resource items.

6. The gaming apparatus according to claim 5, comprising:

the processor receiving payment from the player; and the processor disclosing to the player the at least one resource item selected by the processor from the set of possible resource items in exchange for the payment from the player.

7. The gaming apparatus according to claim 1, comprising, if the at least one resource item selected by the processor from the set of possible resource items matches the at least one resource item from the set of player resource items:

the processor selecting at least one other resource item from the set of possible resource items;

the processor receiving a player selection of at least one other resource item from the set of player resource items; and the processor determining if the at least one other resource item selected by the processor from the set of possible resource items matches the at least one resource item from the set of player resource items corresponding to the player selection.

8. The gaming apparatus according to claim 1, comprising the processor providing an award to the player if the at least one resource item selected by the processor from the set of possible resource items matches the at least one resource item from the set of player resource items.

9. The gaming apparatus according to claim 8, wherein the award comprises one of at least one resource item from the set of possible resource items, at least one credit and money.

* * * * *